US012597741B2

(12) United States Patent
Hsu et al.

(10) Patent No.: US 12,597,741 B2
(45) Date of Patent: Apr. 7, 2026

(54) ELECTRICAL CONNECTOR ASSEMBLY WITH BETTER ANTI-INTERFERENCE AND GROUNDING EFFECTS

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Chun-Hsiung Hsu, New Taipei (TW); Yi-Min Hsu, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 302 days.

(21) Appl. No.: 18/231,980

(22) Filed: Aug. 9, 2023

(65) Prior Publication Data

US 2024/0063586 A1 Feb. 22, 2024

(30) Foreign Application Priority Data

Aug. 19, 2022 (CN) ......................... 202211000183.8

(51) Int. Cl.
*H01R 13/6596* (2011.01)
*H01R 13/516* (2006.01)
*H01R 13/6585* (2011.01)

(52) U.S. Cl.
CPC ....... *H01R 13/6596* (2013.01); *H01R 13/516* (2013.01); *H01R 13/6585* (2013.01)

(58) Field of Classification Search
CPC .............. H01R 13/6595; H01R 13/516; H01R 13/6585; H01R 13/514
USPC ......... 439/607.01, 607.5, 607.51, 607.55, 98
See application file for complete search history.

(56) References Cited

U.S. PATENT DOCUMENTS 9,124,009 B2 9/2015 Atkinson et al.
10,367,308 B2 7/2019 Little et al.
10,559,930 B2 2/2020 Little
2004/0127078 A1* 7/2004 Tondreault ............. H01R 4/242 439/98
2020/0274267 A1 8/2020 Zerebilov et al.
2020/0358227 A1 11/2020 Henry et al.
2020/0366017 A1* 11/2020 Blackburn ......... H01R 13/6594
(Continued)

*Primary Examiner* — Hae Moon Hyeon
(74) *Attorney, Agent, or Firm* — Ming Chieh Chang

(57) ABSTRACT

An electrical connector assembly includes: an insulative housing; a terminal module assembly received in the insulative housing and including an upper part and a lower part stacked with each other in a vertical direction, each of the upper part and the lower part having a high-speed terminal module and a sideband terminal module, each of the high-speed terminal modules including plural ground terminals and differential pair terminals arranged alternately with the ground terminals in a transverse direction perpendicular to the vertical direction; a cable connected to the high-speed terminal module; and a ground bar located at a rear of the ground terminal and a metal shield member discrete from the ground terminal, the ground bar including a first bulged section, the metal shield member including a second bulged section, the first bulged section and the second bulged section cooperating with each other to surround the cable in a circumferential direction.

13 Claims, 16 Drawing Sheets

(56) References Cited

U.S. PATENT DOCUMENTS

| | | | | |
|---|---|---|---|---|
| 2021/0351536 | A1 | 11/2021 | Chung et al. | |
| 2021/0351547 | A1* | 11/2021 | Little | H01R 13/6581 |
| 2022/0173555 | A1* | 6/2022 | Little | H01R 24/76 |
| 2022/0368087 | A1* | 11/2022 | Abe | H01R 13/65915 |
| 2023/0178937 | A1* | 6/2023 | Little | H01R 43/20<br>439/92 |
| 2023/0283020 | A1* | 9/2023 | He | H01R 13/514<br>439/607.55 |
| 2023/0420882 | A1* | 12/2023 | Hsu | H01R 13/514 |
| 2024/0063587 | A1* | 2/2024 | Hsu | H01R 13/6596 |

* cited by examiner

ELECTRICAL CONNECTOR ASSEMBLY WITH BETTER ANTI-INTERFERENCE AND GROUNDING EFFECTS

BACKGROUND OF THE INVENTION

Field of the Invention

The present invention relates generally to an electrical connector assembly, and particularly to an electrical connector assembly having a metal shield member.

Description of Related Arts

U.S. patent Ser. No. 10/559,930 discloses an electrical connector assembly comprising a high-speed terminal and a sideband terminal. The sideband terminal is mounted to the external printed circuit board, and the high-speed terminal is connected to a cable. No shielding measures are taken at the connection between the cable and the high-speed terminal, which affects the transmission effect of the signal.

An improved electrical connector assembly is desired.

SUMMARY OF THE INVENTION

The objective of the present invention is to provide an electrical connector assembly with better anti-interference and grounding effects.

To achieve the above object, an electrical connector assembly comprises: an insulative housing forming a front mating slot and a rear receiving space; a terminal module assembly received in the insulative housing and including an upper part and a lower part stacked with each other in a vertical direction, each of the upper part and the lower part comprising a high-speed terminal module and a sideband terminal module, each of the high-speed terminal modules including a plurality of ground terminals and differential pair terminals arranged alternately with the ground terminals in a transverse direction perpendicular to the vertical direction; a cable connected to the high-speed terminal module; and a ground bar located at a rear of the ground terminal and a metal shield member discrete from the ground terminal, the ground bar including a first bulged section, the metal shield member including a second bulged section, the first bulged section and the second bulged section cooperating with each other to surround the cable in a circumferential direction.

Compared to prior art, in the electrical connector assembly of the present invention includes a ground bar located at the rear end of the ground terminal and a metal shield member separately from the ground terminal, the ground bar includes a first bulged section, the metal shield member includes a second bulged section, and the first bulged section and the second bulged section cooperate with each other to surround the corresponding cable in the circumferential direction to form a better shielding effect and achieve better anti-interference and grounding effects.

DETAILED DESCRIPTION OF THE PREFERRED EMBODIMENT

Figure 1:
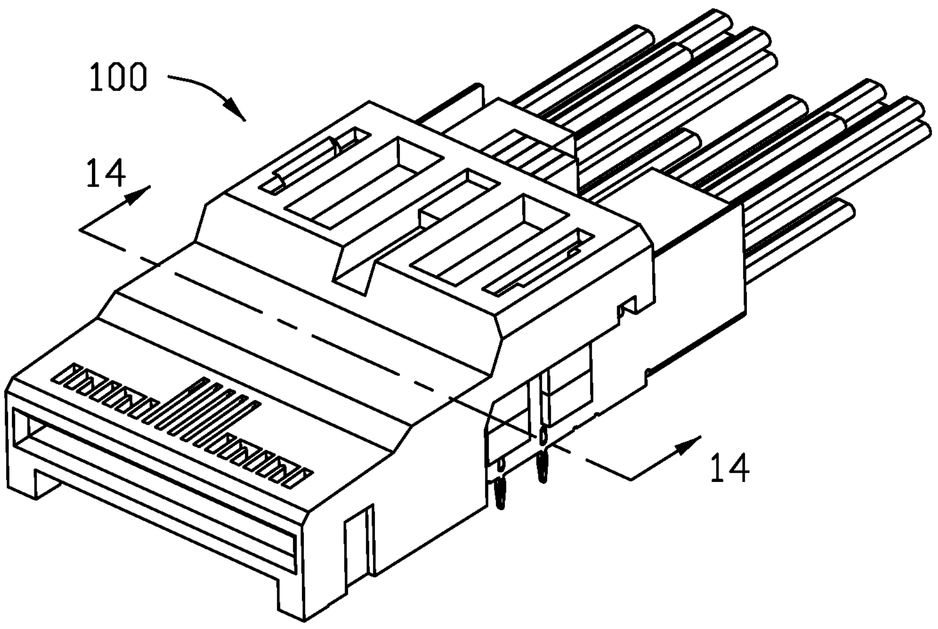
FIG. 1 is a perspective view of an electrical connector assembly according to the present invention.
Figure 2:
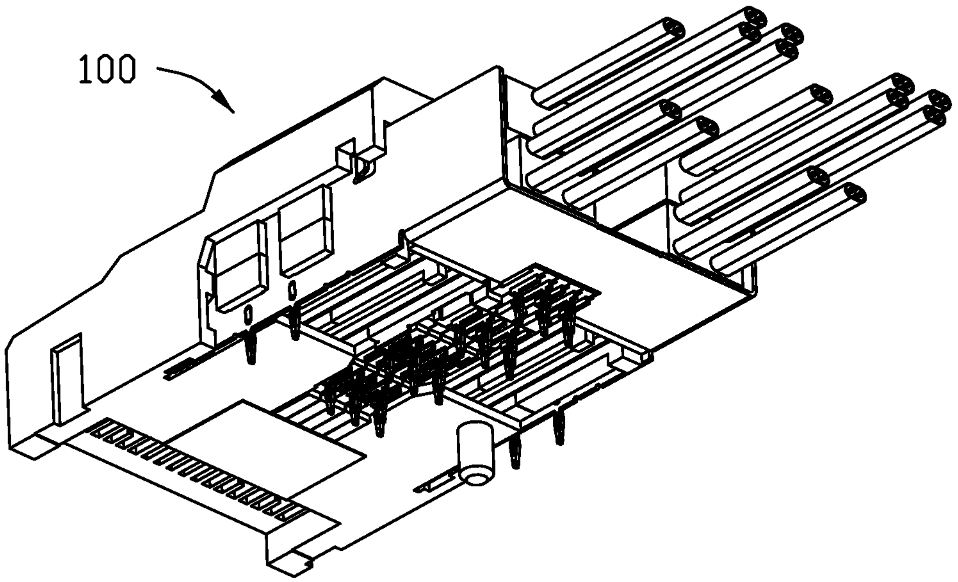
FIG. 2 is another perspective view of the electrical connector assembly of FIG. 1.
Figure 3:
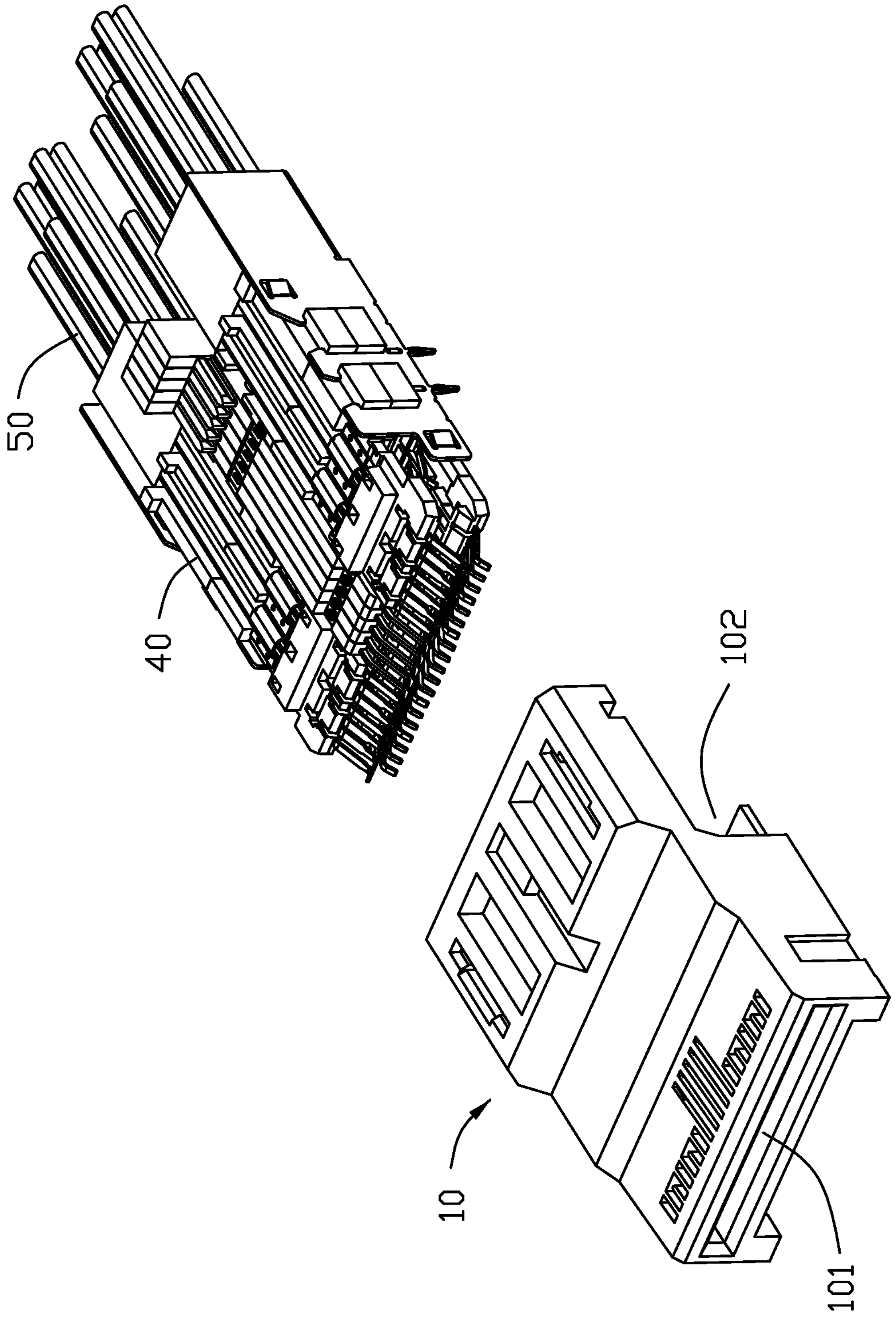
FIG. 3 is an exploded perspective view of the electrical connector assembly of FIG. 1.
Figure 4:
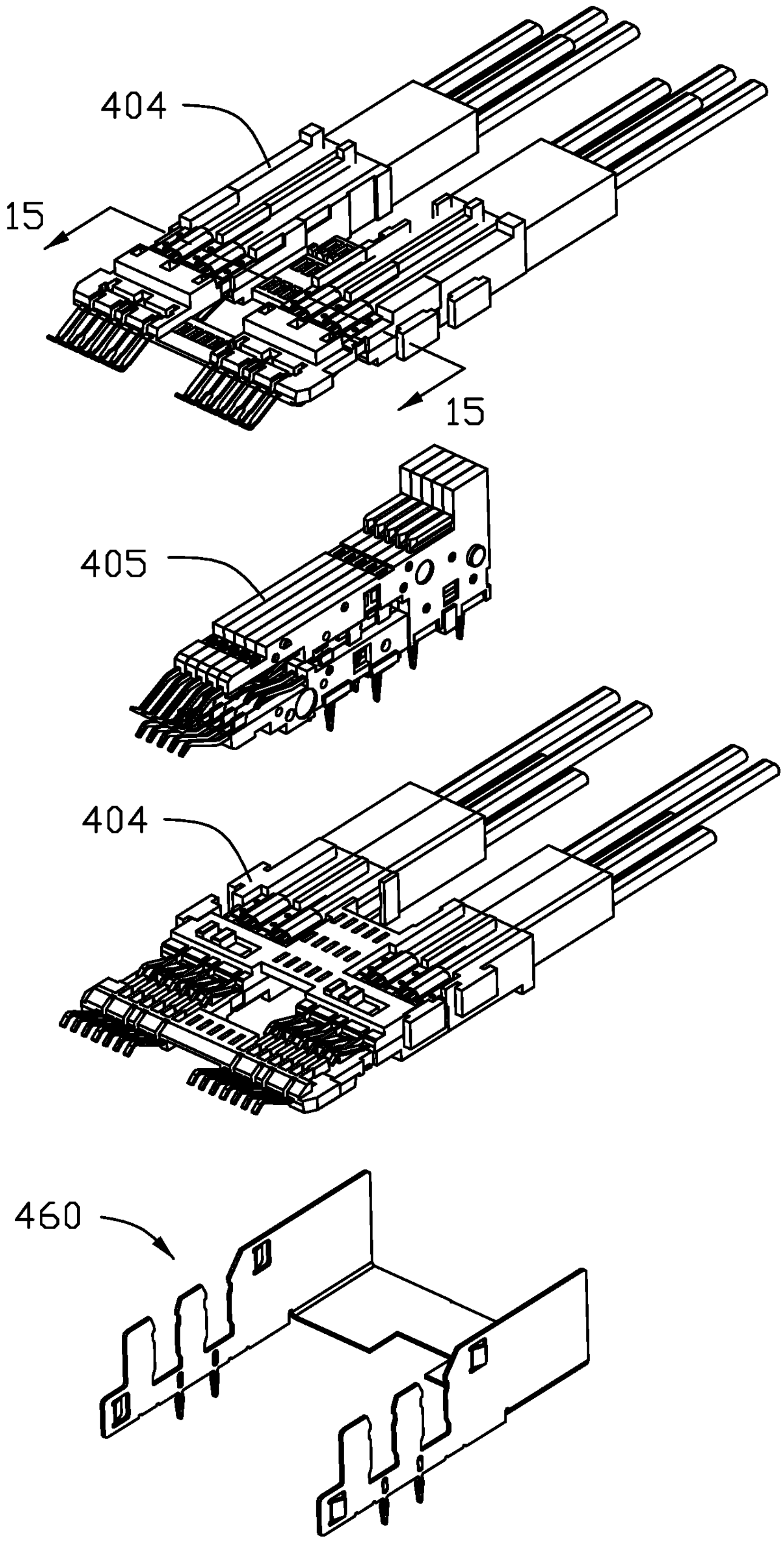
FIG. 4 is an exploded perspective view of the electrical connector assembly of FIG. 3 without showing the insulative housing.
Figure 5:
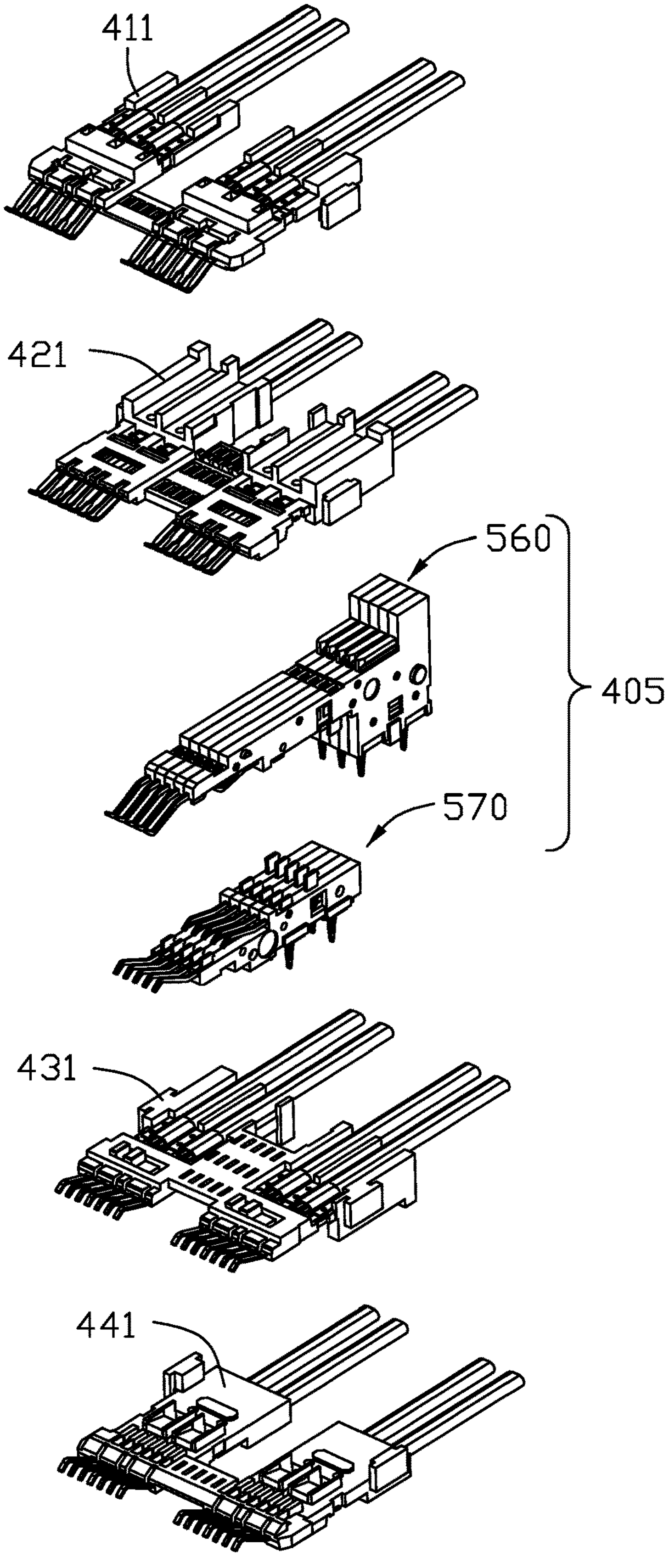
FIG. 5 is an exploded perspective view of the terminal module of the electrical connector assembly of FIG. 4.
Figure 6:
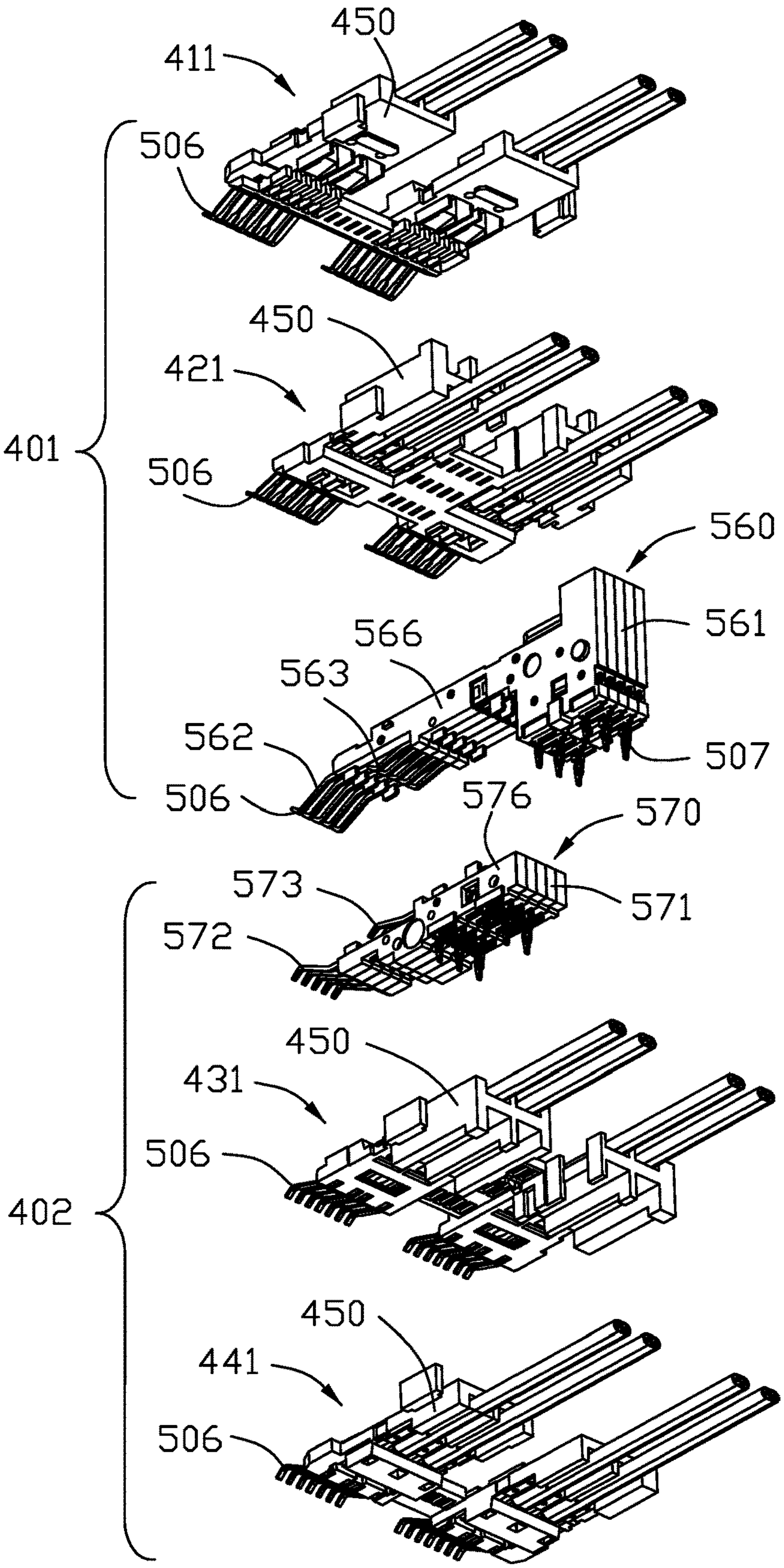
FIG. 6 is another exploded perspective view of the terminal module of the electrical connector assembly of FIG. 5.
Figure 7:
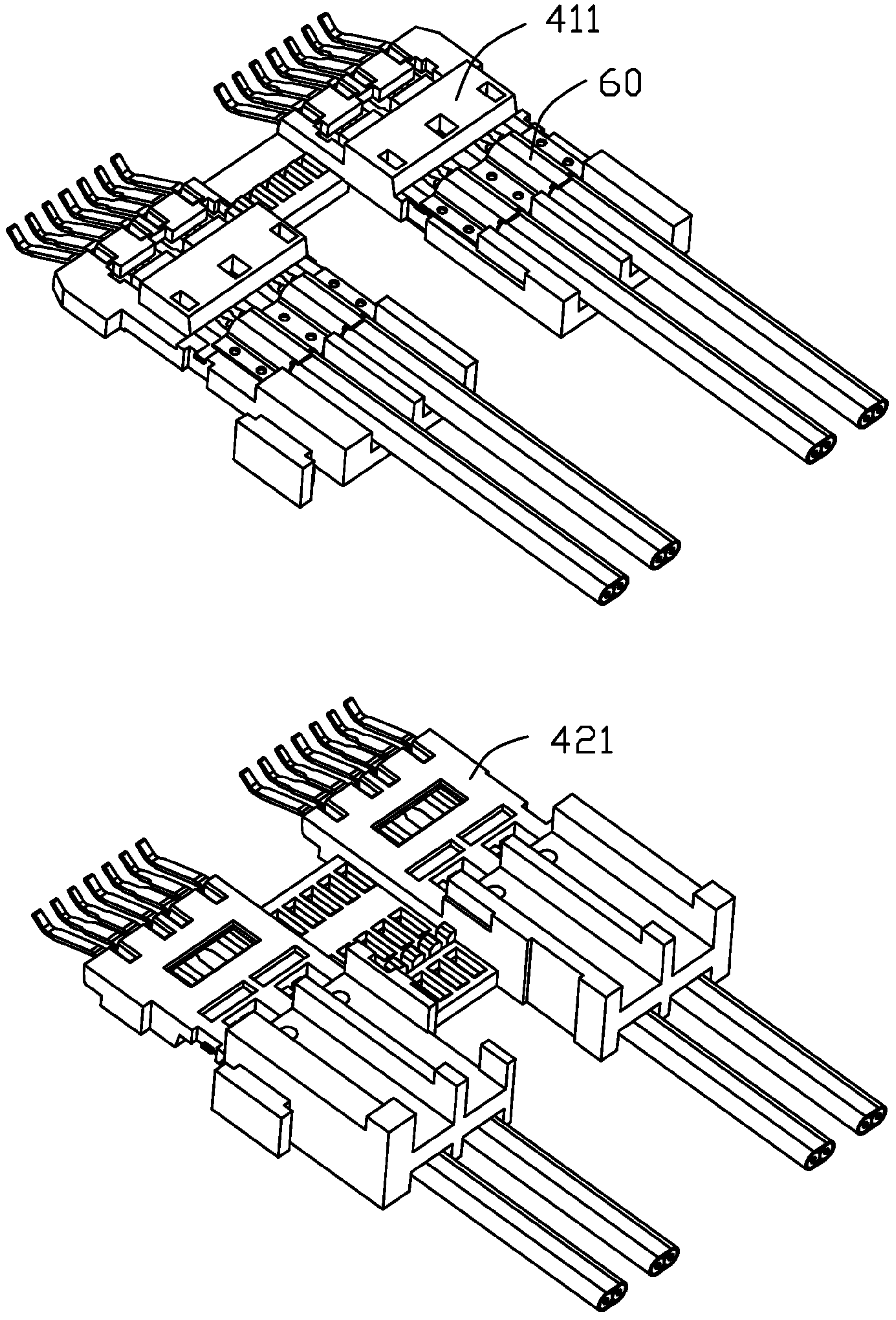
FIG. 7 is an exploded perspective view of the high-speed terminal module of the upper part of the electrical connector assembly of FIG. 5.
Figure 8:
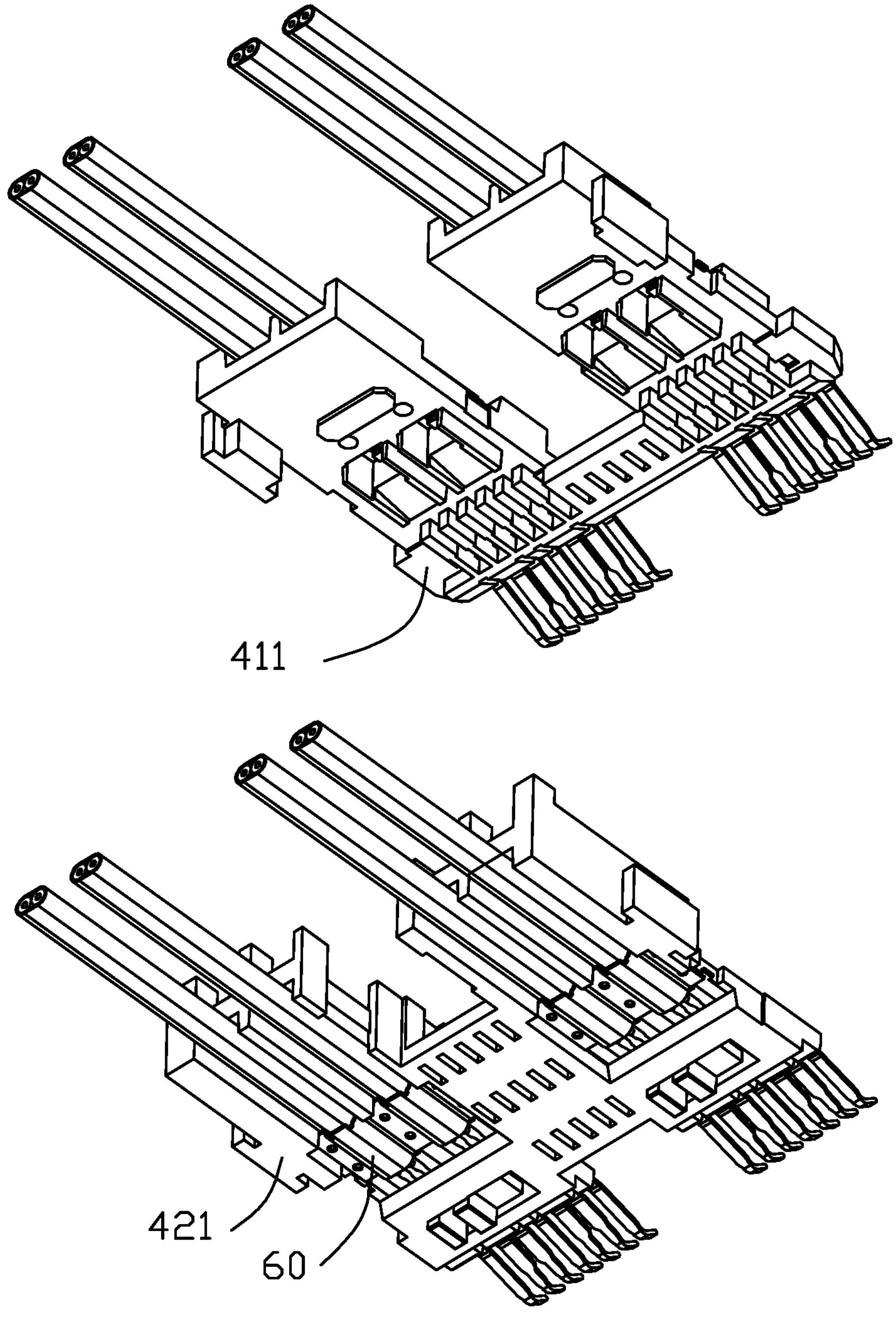
FIG. 8 is another exploded perspective view of the high-speed terminal module of the upper part of the electrical connector assembly of FIG. 5.
Figure 9:
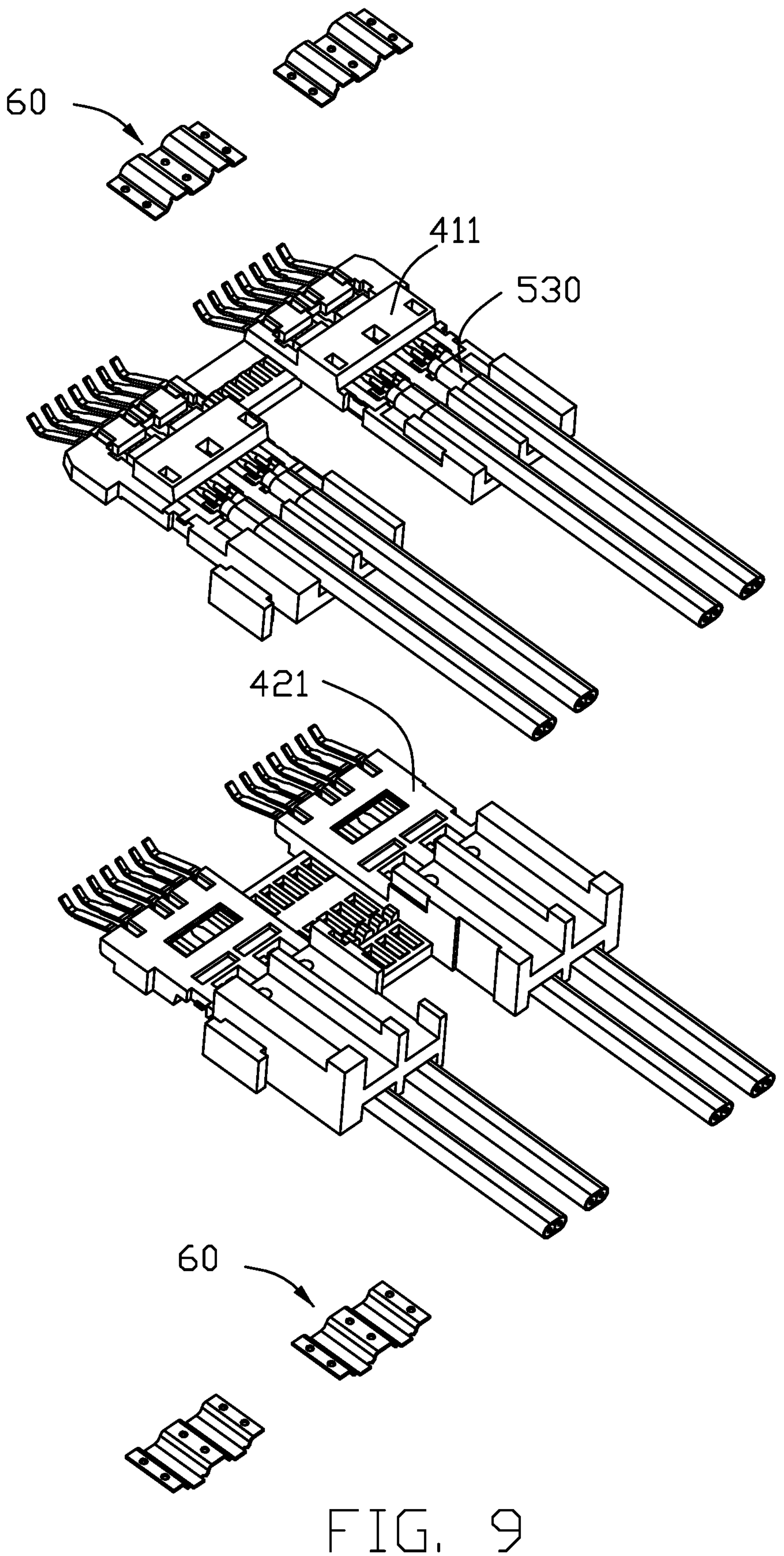
FIG. 9 is a further exploded perspective view of the high-speed terminal module of the upper part of FIG. 7.
Figure 10:
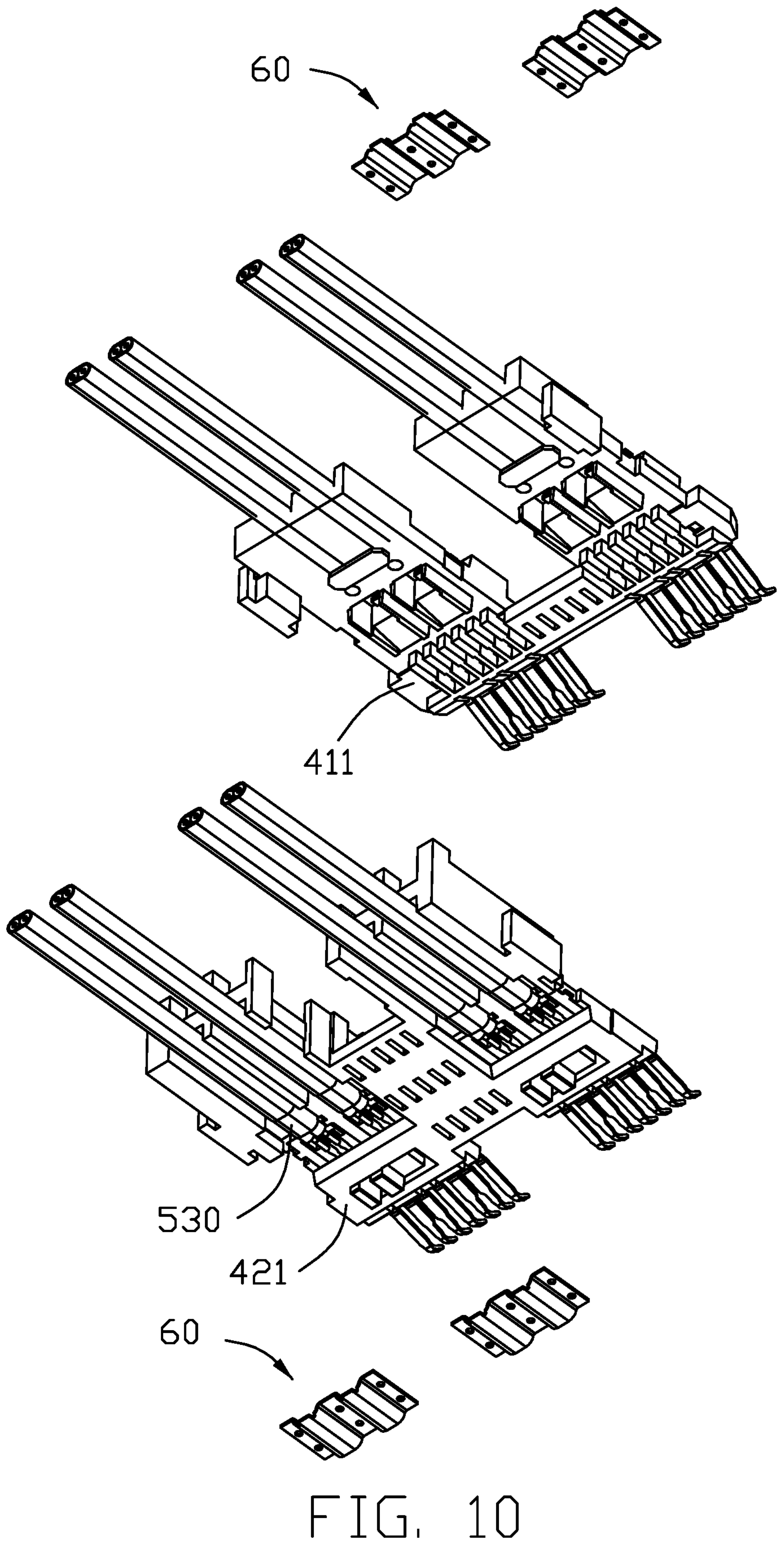
FIG. 10 is another exploded perspective view of the high-speed terminal module of the upper part of FIG. 9.
Figure 11:
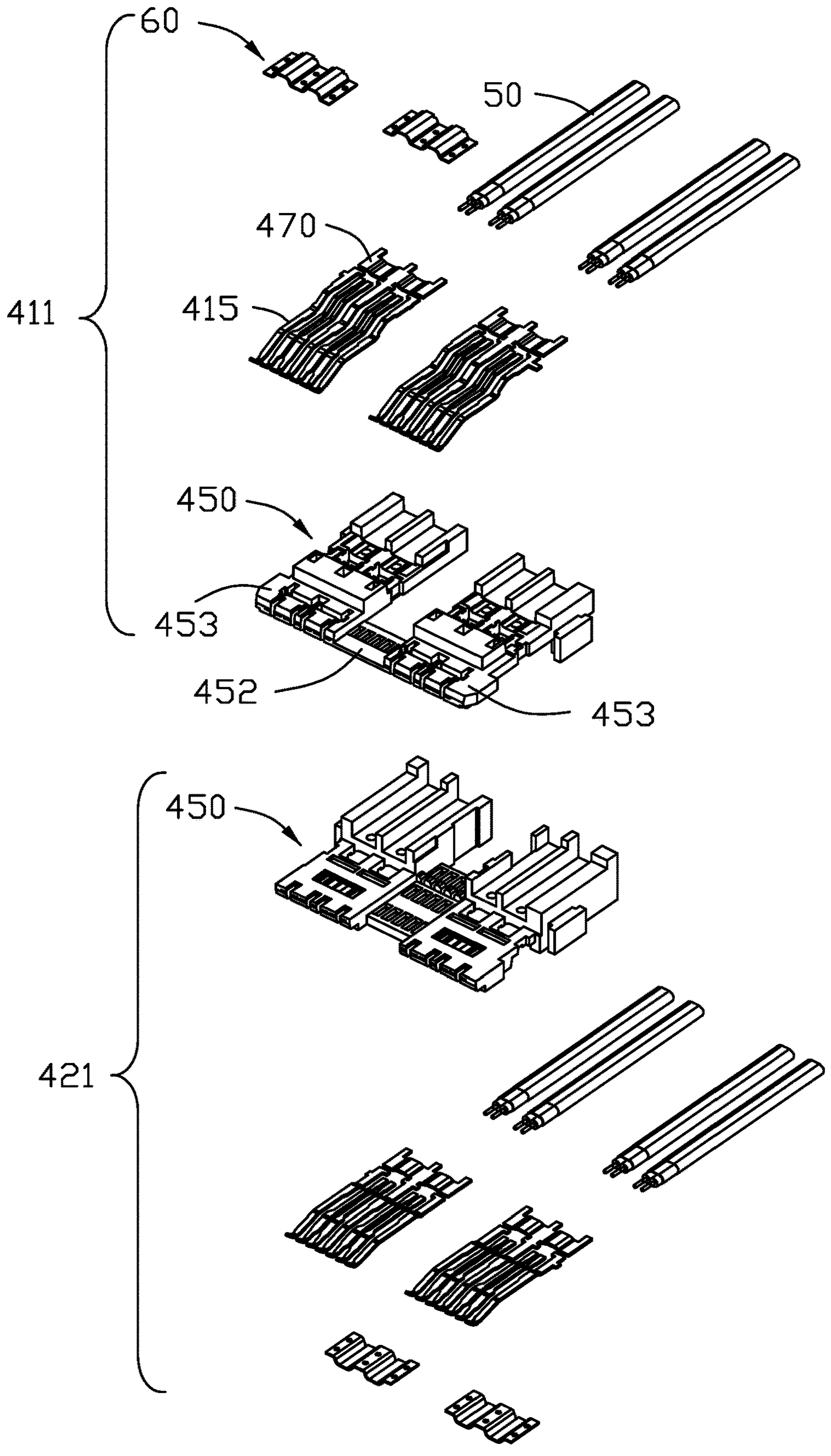
FIG. 11 is a further exploded view of the high-speed terminal module of the upper part of FIG. 9.
Figure 12:
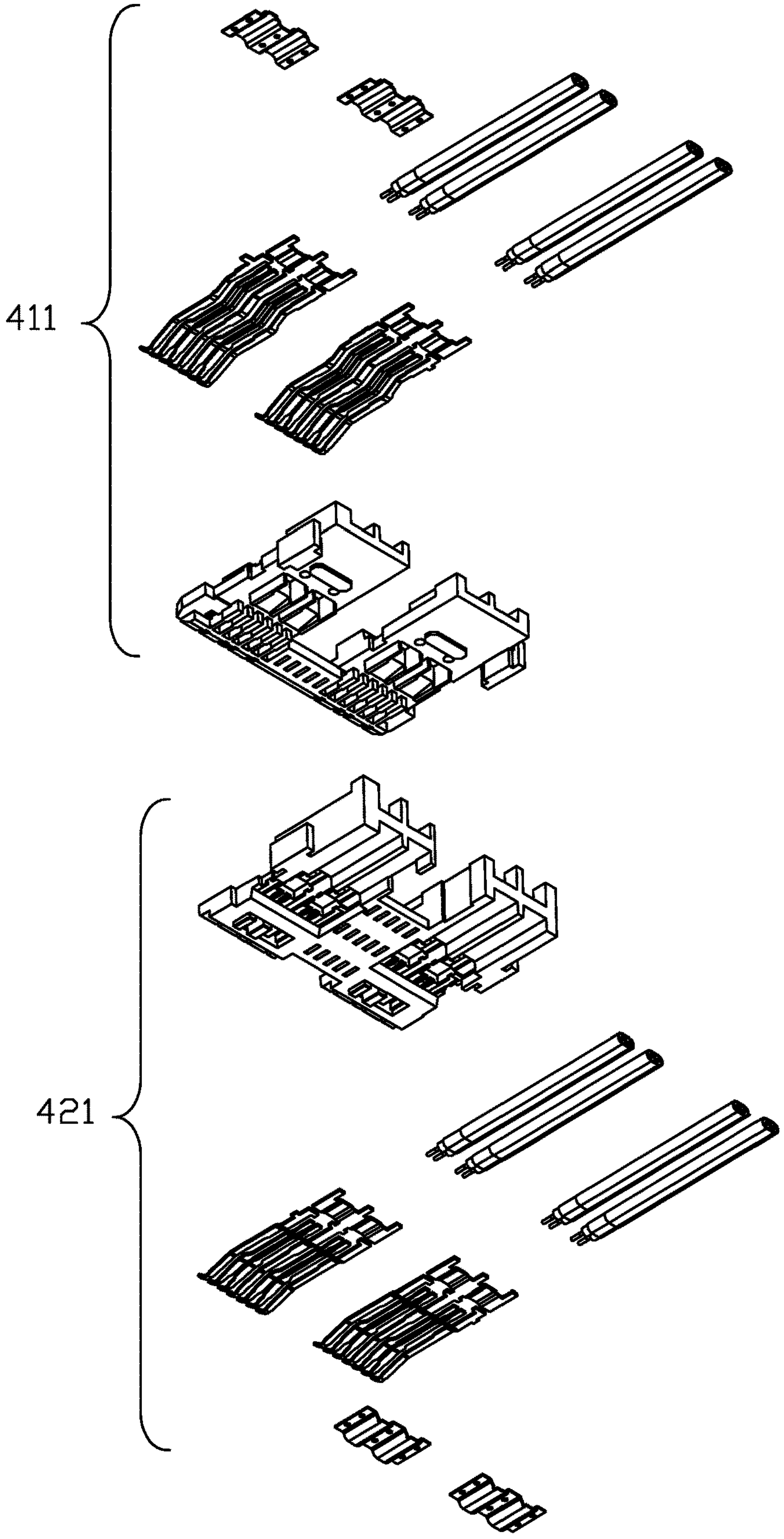
FIG. 12 is a another exploded view of the high-speed terminal module of the upper part of FIG. 10.
Figure 13:
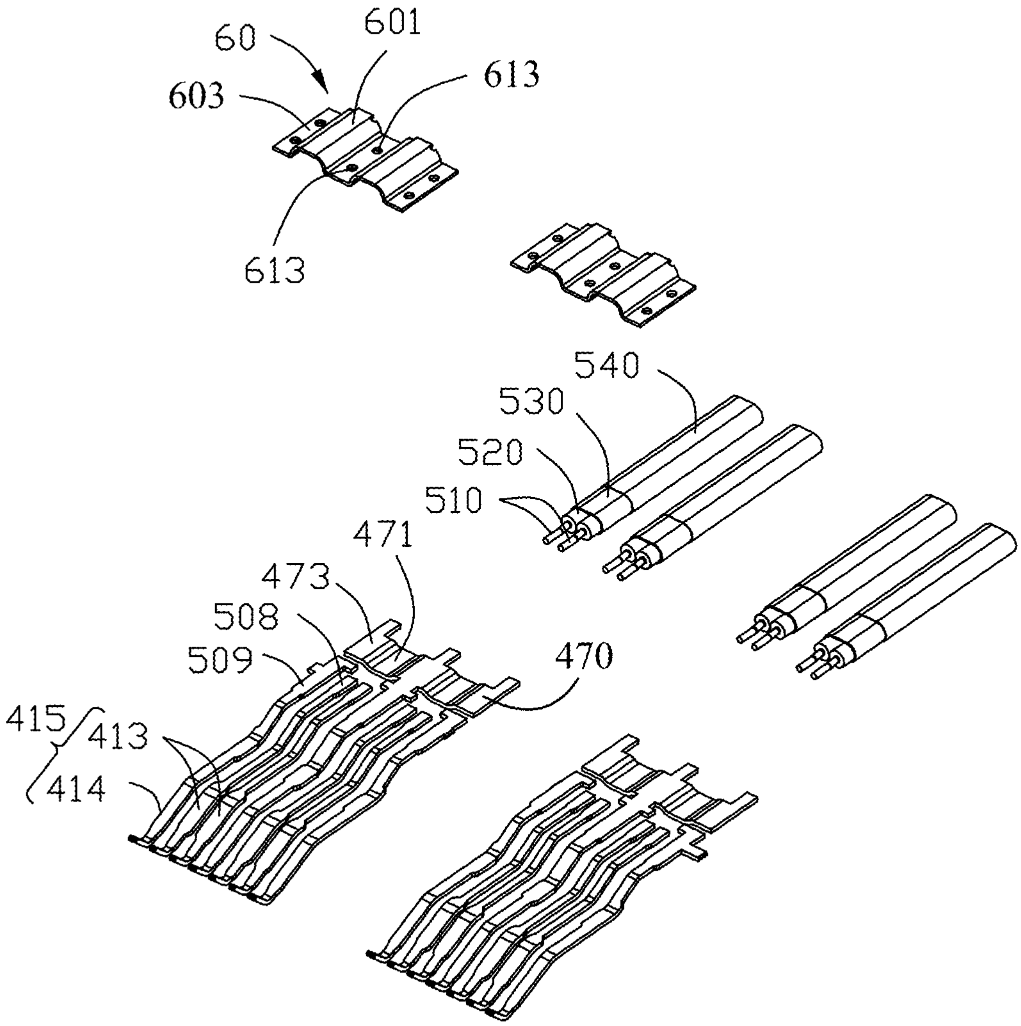
FIG. 13 is an exploded view of the first terminal module of the high-speed terminal module of the upper part of FIG. 11 without showing the insulator.
Figure 14:
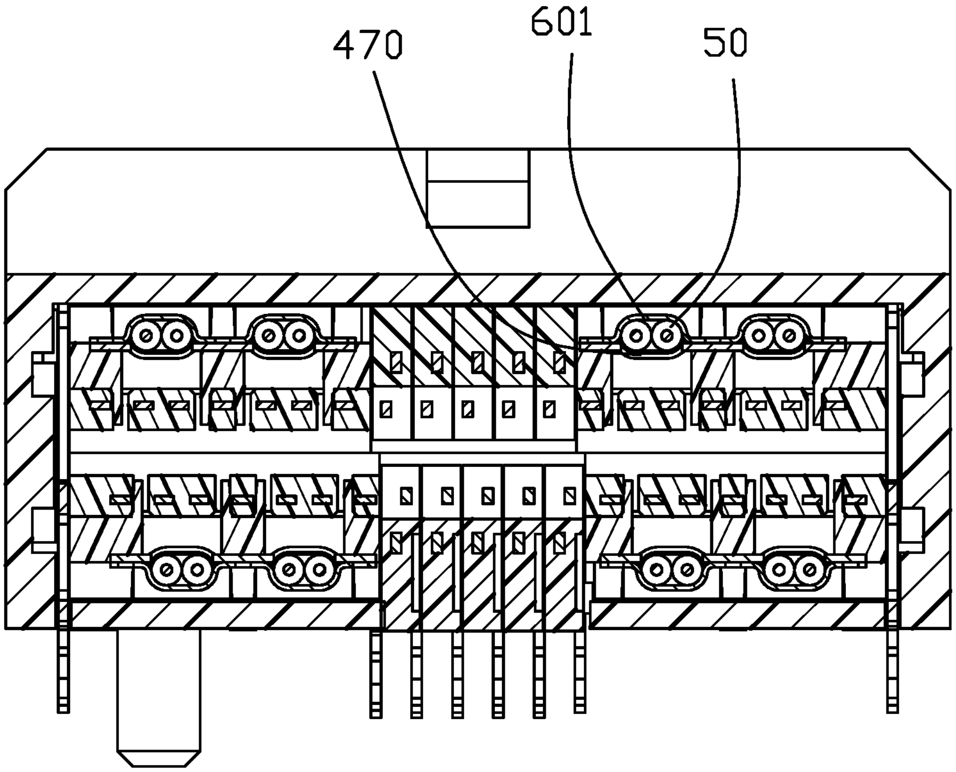
FIG. 14 is a cross-sectional view taken along line 14-14 of the electrical connector assembly of FIG. 1.
Figure 15:
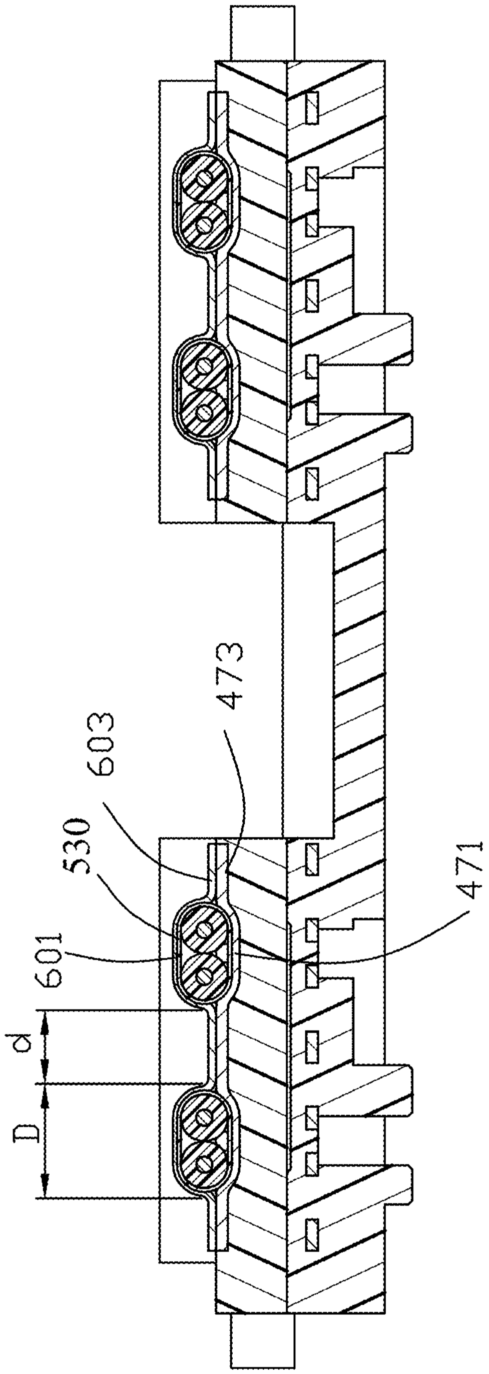
FIG. 15 is a cross-sectional view taken along line 15-15 of the electrical connector assembly of FIG. 1.
Figure 16:
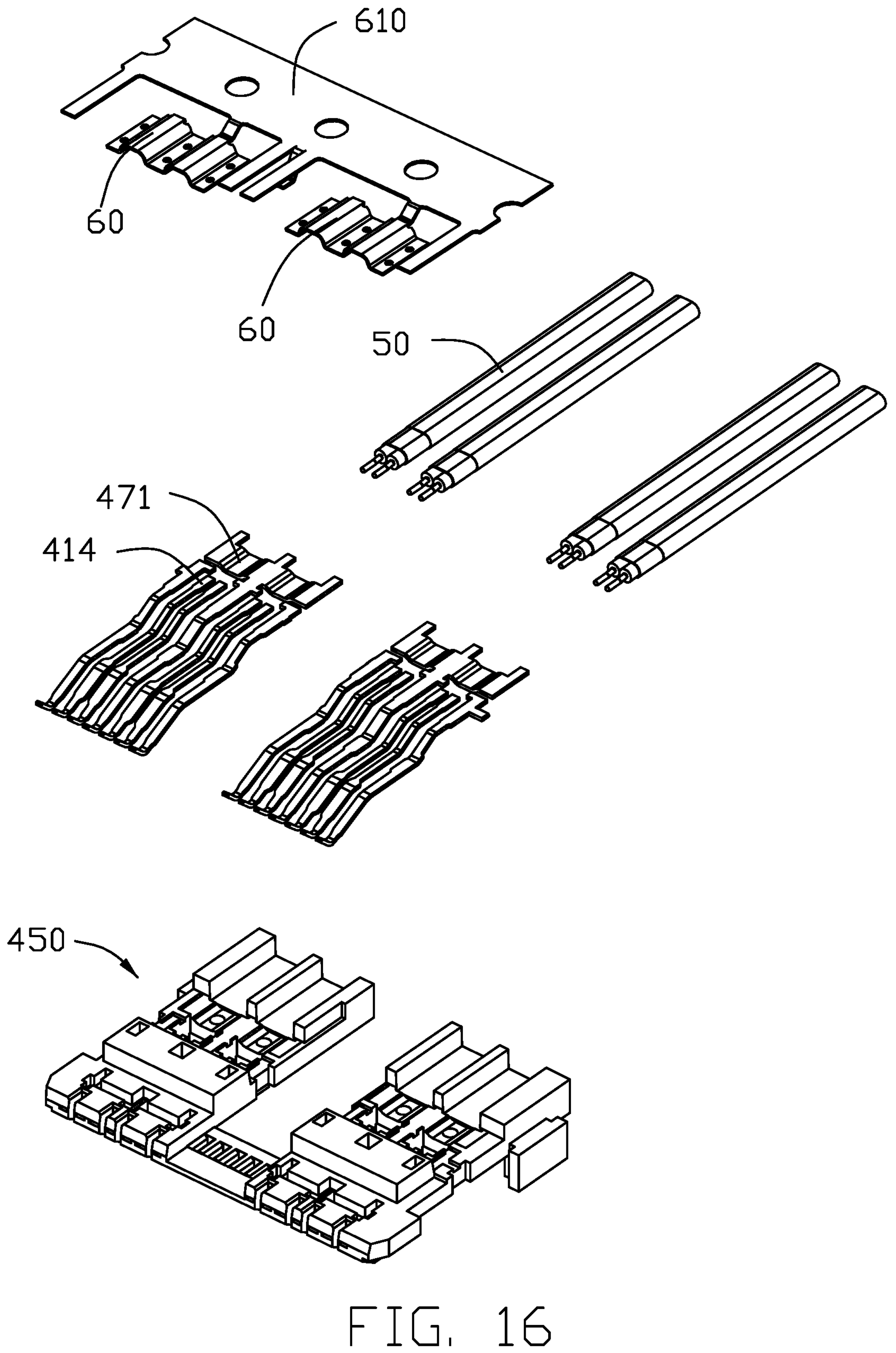
FIG. 16 is an exploded view of the metal shield member and strip of the high-speed terminal module of FIG. 1 before separation.

Referring to FIGS. 1-16, an electrical connector assembly 100 in accordance with the present invention is shown. The electrical connector assembly 100 can be matched with a mating connector (not shown) along the front-to-back direction and comprises an insulative housing 10, a terminal module assembly 40 received in the insulating housing 10, and plural cables 50 connected to the terminal module assembly 40. The housing 10 has a front mating slot 101 and a rear receiving space 102. The terminal module assembly 40 is received in the rear receiving space 102 from rear to the front. The front mating slot 101 can accommodate the mating tongue of the mating connector.

The terminal module assembly 40 includes an upper part 401 and a lower part 402 stacked with each other in the vertical direction. Each of the upper part 401 and the lower part 402 include a high-speed terminal module 404 and a sideband terminal module 405 assembled on the high-speed terminal module 404. The high-speed terminal module 404 of the upper part 401 and the lower part 402 are essentially arranged in a mirror image manner in the vertical direction. The high-speed terminal module 404 of the upper part 401 includes a first terminal module 411 and a second terminal module 421 under the first terminal module 411. The high-speed terminal module 404 of the lower part 402 includes a third terminal module 431 and a fourth terminal module 441 under the third terminal module 431. Each of the first terminal module 411, the second terminal module 421, the third terminal module 431 and the fourth terminal module 441 includes a unitary insulator 450 and a plurality of conductive terminals 415 (see FIG. 13) integrally formed with the insulator 450 via insert-molding.

Based upon the similarity of the four terminal modules, only the first terminal module 411 is described in detail. The insulator 450 includes a middle sector 452 and a pair of side sector 453 located by two sides of the middle sector 452 in the transverse direction. The conductive terminals 415 are divided into two groups retained in the corresponding side sector 453. Each group of the conductive terminals 415 includes two pairs of differential pair terminals 413 arranged alternately with three ground terminals 414.

The sideband terminal module 405 includes an upper sideband sub-module 560 located in the upper part 401 and a lower sideband sub-module 570 located in the lower part 402. The upper sideband sub-module 560 includes a plurality of upper wafer 561 stacked in the transverse direction, and the lower sideband sub-module 570 includes a plurality of lower wafer 571 stacked in the transverse direction. Each of the upper wafers 561 includes an upper fixing member 566, and an upper sideband terminal 562 and a lower sideband terminal 563 integrally formed with the upper fixing member 566 via an insert-molding process. Each of the lower wafers 571 includes a lower fixing member 576, and an upper sideband terminal 573 and a lower sideband terminal 572 integrally formed with a lower fixing member 576 via an insert-molding process. Each of the sideband terminals of the sideband terminal module 405 is assembled in the middle sector 452 of the corresponding insulator 450. In this way, in the transverse direction, the two groups of the conductive terminals 415 are respectively located on two sides of the sideband terminals. Each of the sideband terminal, the differential pair terminal 413 and the ground terminal 414 has a mating portion 506 at the front for mating with the mating connector. Each of the sideband terminals further has a sideband tail 507 that can be directly mounted on a printed circuit board. Each of the differential pair terminal 413 further has a tail portion 508 mechanically and electrically connected to the corresponding cable 50. The rear end of the tail portion 509 of the ground terminal 414 is provided with a ground bar 470. The ground bar 470 is integrally connected with at least one of the three ground terminals 414. Specifically, in the present invention, the ground bar 470 is integrally connected with the ground terminal 414 in the middle.

The mating portions 506 of the upper sideband terminals 562 on the upper part is aligned with the mating portions 506 of the conductive terminals 415 of the first terminal module 411 in the lateral direction. The mating portions 506 of the upper lower sideband terminals 563 is aligned with the mating portions 506 of the conductive terminals 415 of the second terminal module 421 in the lateral direction. Similarly, the mating portions 506 of the lower upper sideband terminals 573 is aligned with the mating portions 506 of the conductive terminals 415 of the third terminal module 431 in the lateral direction, the mating portions 506 of the lower sideband terminals 572 in the lower part is aligned with the mating portions 506 of the conductive terminals 415 of the fourth terminal modules 441 in the lateral direction.

The terminal module assembly 40 further comprises a metal fixing member 460 fixing the upper part 401 and the lower part 402 together, so that the terminal module assembly 40 is integrated assembled into the insulating housing 10.

The cable 50 includes a pair of inner conductors 510, a pair of inner insulative layers 520, a common metal shielding layer 530 and an outer layer 540 covering the common shielding layer 530. The pair of inner conductors 510 are soldered to the corresponding tails 508 of the differential pair terminals 413. The common shielding layer 530 is mechanically and electrically connected to the ground bar 470.

The electrical connector assembly 100 further includes a metal shield member 60 which is discrete from the ground terminal 414. Each of the ground bar 470 includes two first bulged sections 471 and three first level sections 473. The metal shield member 60 includes two second bulged sections 601 and three second level sections 603. The first bulged sections 471 and the second bulged sections 601 cooperate with each other to completely cover the exposed part of the common shielding layer 530. Both the first bulged sections 471 and the second bulged sections 601 are in contact with the corresponding common shielding layer 530 and are electrically connected thereto.

The metal shield member 60 is mechanically and electrically connected to the ground terminal 414 and the ground bar 470. Specifically, in the present invention, the rear half of the second level sections 603 of the metal shield member 60 cooperates with the corresponding first level sections 473 in the vertical direction. The front half of the second level sections 603 of the metal shield member 60 cooperates with the corresponding ground terminal 414 in the vertical direction. Each of the second level section 603 has holes 613 for solder, through which the metal shield member 60 directly soldered to the ground bar 470 and the ground terminal 414. The matching dimension d (see FIG. 15) of the first level section 473 and the second level section 603 in the transverse direction is at least half of the matching dimension D (see FIG. 15) of the first bulged section 471 and the second bulged section 601. The metal shield member 60 is formed by punching and bending from a metal sheet. In production, in order to facilitate the installation and positioning of the metal shield member 60, the metal shield member 60 connected to the two sides of the same high speed terminal module are connected together through connecting strips 610, which is removed after the metal shield member 60 is soldered on the ground bar 470 and the ground terminal 414. In the present invention, the metal shielding member 60 connects the common shielding layer 530, the ground terminal 414 and the ground bar in series, which has a better grounding effect and improves the signal transmission performance of the connector assembly.

In the electrical connector assembly 100 of the present invention, the first bulged sections 471 of the ground bar 470 cooperates with the second bulged sections 601 of the metal shield member 60 to completely surround the corresponding cables 50 in the circumferential direction which improves the signal transmission performance of the connector assembly.

The electrical connector assembly 100 of the present invention conforms to the specification of QSFP-DD (Quad Small Form-factor Pluggable Double Density), which defines eight transmitting channels and eight receiving channels, the signal transmission rate of each channel can reach 50 Gbps or above. Of course, the present invention can also be applied to high-speed electrical connectors assembly such as SFP-DD (Small Form-factor Pluggable Double Density), SFP (Small Form-factor Pluggable), OSFP (Octal Small Form-factor Pluggable), etc.

The invention claimed is:

1. An electrical connector assembly comprising:

an insulative housing forming a front mating slot and a rear receiving space;

a terminal module assembly received in the rear receiving space of the insulative housing and including an upper part and a lower part stacked with each other in a vertical direction and exposed to the front mating slot for engaging a mating connector, each of the upper part and the lower part comprising a high-speed terminal module and a sideband terminal module, each of the high-speed terminal modules including a plurality of ground terminals and differential pair terminals arranged alternately with the ground terminals in a transverse direction perpendicular to the vertical direction;

a cable connected to the high-speed terminal module; and a ground bar located at a rear of the ground terminal and a metal shield member discrete from the ground terminal, the ground bar including a first bulged section, the metal shield member including a second bulged section, the first bulged section and the second bulged section cooperating with each other to surround the cable in a circumferential direction.

2. The electrical connector assembly as claimed in claim 1, wherein the metal shield member is mechanically and electrically connected to the ground terminal and the ground bar.

3. The electrical connector assembly as claimed in claim 2, wherein the ground bar comprises a first level section, the metal shield member includes a second level section, and the second level section cooperates with the first level section in the vertical direction.

4. The electrical connector assembly as claimed in claim 3, wherein the second level section is mechanically and electrically connected to a corresponding ground terminal in the vertical direction.

5. The electrical connector assembly as claimed in claim 3, wherein a matching dimension of the first level section and the second level section in the transverse direction is at least half of a matching dimension of the first bulged section and the second bulged section in the transverse direction.

6. The electrical connector assembly as claimed in claim 3, wherein the second level section further comprises a hole for solder, through which the metal shield member is directly soldered to the ground bar and the ground terminal.

7. The electrical connector assembly as claimed in claim 6, wherein the metal shield member is stamped from a metal sheet and is connected with a strip at a rear end thereof, and the strip is removed after the metal shield member is soldered to the ground bar and the ground terminal.

8. The electrical connector assembly as claimed in claim 3, wherein the cable includes a pair of inner conductors, a pair of inner insulative layers, and a common metal shielding layer, the inner conductors is mechanically and electrically connected to the corresponding differential pair terminals, and the metal shielding layer is mechanically and electrically connected to the ground bar and the metal shield member.

9. The electrical connector assembly as claimed in claim 8, wherein both the first bulged section and the second bulged section are in contact with the metal shielding layer and are electrically connected to the metal shielding layer.

10. The electrical connector assembly as claimed in claim 1, wherein at least one of the ground terminals is integrally connected with the ground bar.

11. The electrical connector assembly as claimed in claim 1, wherein the high-speed terminal module of the upper part includes a first terminal module and a second terminal module under the first terminal module, the high-speed terminal module of the lower part includes a third terminal module and a fourth terminal module under the third terminal module, and each of the first terminal module, the second terminal module, the third terminal module, and the fourth terminal module has a unitary insulator and a plurality of high-speed terminals integrally formed within the insulator via an insert-molding process.

12. The electrical connector assembly as claimed in claim 11, wherein the sideband terminal module includes a plurality of sideband terminals, and the sideband terminals are assembled on the insulator.

13. The electrical connector assembly as claimed in claim 12, wherein the insulator includes a middle sector and a pair of side sectors located by two sides of the middle sector in the transverse direction, the sideband terminal is located in the middle sector, and the differential pair terminals are divided into two groups retained in a corresponding side sector.

* * * * *